United States Patent
Gibson et al.

(10) Patent No.: US 7,305,300 B2
(45) Date of Patent: Dec. 4, 2007

(54) CLOSED PEDAL DECELERATION CONTROL

(75) Inventors: Alex Gibson, Ann Arbor, MI (US); Ilya Kolmanovsky, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 174 days.

(21) Appl. No.: 11/307,557

(22) Filed: Feb. 13, 2006

(65) Prior Publication Data

US 2007/0192018 A1 Aug. 16, 2007

(51) Int. Cl.
*G06F 19/00* (2006.01)
*F02D 13/04* (2006.01)

(52) U.S. Cl. ...................... 701/110; 123/399

(58) Field of Classification Search ................ 701/110, 701/114, 102, 54; 123/399, 361, 352, 350, 123/320, 321
See application file for complete search history.

(56) References Cited

U.S. PATENT DOCUMENTS

| 4,550,372 | A | 10/1985 | Kahrs |
| 4,850,650 | A | 7/1989 | Eckert et al. |
| 5,558,409 | A | 9/1996 | Walenty et al. |
| 5,646,848 | A | 7/1997 | Walenty et al. |
| 6,155,217 | A | 12/2000 | Shiraishi et al. |
| 6,179,389 | B1 * | 1/2001 | Freitag et al. ............... 180/422 |
| 6,192,857 | B1 | 2/2001 | Shimada |
| 6,199,004 | B1 * | 3/2001 | Russell et al. ................. 701/54 |
| 6,263,857 | B1 | 7/2001 | Obata et al. |
| 6,535,808 | B1 | 3/2003 | Zumberge |
| 2007/0026995 | A1 * | 2/2007 | Doering ....................... 477/107 |

* cited by examiner

*Primary Examiner*—Hieu T. Vo
(74) *Attorney, Agent, or Firm*—Donald Lewis; Bir Law, PLC; David S. Bir

(57) ABSTRACT

A system and method for controlling an internal combustion engine in a vehicle include controlling the engine to achieve a desired vehicle speed/deceleration when the accelerator pedal is released. A desired vehicle deceleration may be determined based on current transmission gear, vehicle speed, and road grade. Vehicle speed/deceleration is measured using a vehicle speed sensor and/or wheel speed sensor(s) and the engine is controlled to reduce the error between the desired and measured decelerations. Electronically actuated intake and/or exhaust valves, and/or an electronically controlled throttle may be used to achieve a desired vehicle deceleration profile. A selector switch or similar device may be used by the driver to select a desired deceleration profile from two or more available profiles and/or a desired deceleration profile may be automatically selected based on current ambient and/or vehicle/engine operating conditions.

22 Claims, 3 Drawing Sheets

CLOSED PEDAL DECELERATION CONTROL

BACKGROUND OF THE INVENTION

1. Field of the Invention

The present invention relates to systems and methods for control of an internal combustion engine to provide vehicle deceleration closed-loop control when the accelerator pedal is fully released or closed.

2. Background Art

Control strategies for vehicles with internal combustion engines often use both closed-loop feedback control and open-loop control for various engine/vehicle functions and operating conditions. Closed-pedal operation of the engine while the vehicle is moving, i.e. when the driver fully releases the accelerator pedal, has traditionally been open-loop with the engine being returned to idle and the vehicle deceleration profile not actively controlled. As such, the vehicle speed/deceleration profile for closed-pedal operation changes as a function of various engine, vehicle, and ambient operating conditions such as engine pumping losses, driveline friction, road load, road grade, vehicle loading, wind speed and direction, etc. For example, if the driver is approaching another vehicle while climbing a hill and releases the accelerator pedal to reduce speed, the vehicle decelerates more rapidly than if the vehicle was descending a hill and the driver released the accelerator pedal.

The present inventors have recognized that a closed-pedal behavior that is less dependent on the operating environment may enhance drivability of the vehicle and that by controlling the closed-pedal deceleration it would be possible to calibrate the vehicle deceleration as a function of vehicle brand image and/or vehicle type, e.g. sports car vs. truck, taking into account the current operating environment, e.g. ambient temperature and pressure, vehicle load, road grade, on-road or off-road operation, etc.

SUMMARY OF THE INVENTION

A system and method for controlling an internal combustion engine in a vehicle include controlling the engine to achieve a desired vehicle speed/deceleration when the accelerator pedal is released.

In one embodiment, a desired vehicle deceleration is determined when the accelerator pedal is released using a look-up table based on current transmission gear, vehicle speed, and road grade. Current vehicle speed/deceleration is measured using a vehicle speed sensor and/or wheel speed sensor(s) and the engine is controlled to reduce the error between the desired and measured decelerations. Various embodiments control electronically actuated intake and/or exhaust valves and/or an electronically controlled throttle to achieve a desired vehicle deceleration profile. In one embodiment, a selector switch or similar device is used by the driver to select a desired deceleration profile from two or more available profiles. In another embodiment, a desired deceleration profile is automatically determined by the vehicle/engine controller based on current ambient and/or vehicle/engine operating conditions.

A method for controlling an internal combustion engine in a vehicle having an accelerator pedal to provide a characteristic vehicle deceleration under varying ambient conditions according to another embodiment of the invention includes controlling at least one engine actuator to provide a first engine torque corresponding to a first engine operating point in response to the accelerator pedal being released, and controlling at least one engine actuator to provide a second engine torque corresponding to the same first engine operating point in response to the accelerator pedal being released, the second engine torque varying with vehicle operating conditions.

The present invention provides a number of advantages. For example, the present invention provides a more consistent closed-pedal behavior that is less dependent on the operating environment to enhance vehicle drivability. The present invention provides closed-loop control of vehicle deceleration when the accelerator pedal is released so that the deceleration may be calibrated for different vehicle types, different operating conditions, and/or may be selected by the driver with a mode switch, for example.

The above advantages and other advantages and features of the present invention will be readily apparent from the following detailed description of the preferred embodiments when taken in connection with the accompanying drawings.

DETAILED DESCRIPTION OF THE PREFERRED EMBODIMENT(S)

As those of ordinary skill in the art will understand, various features of the present invention as illustrated and described with reference to any one of the Figures may be combined with features illustrated in one or more other Figures to produce embodiments of the present invention that are not explicitly illustrated or described. The combinations of features illustrated provide representative embodiments for typical applications. However, various combinations and modifications of the features consistent with the teachings of the present invention may be desired for particular applications or implementations. The present invention relates to a system and method for controlling vehicle deceleration in a vehicle having a multiple cylinder internal combustion engine. The representative embodiments used to illustrate and describe the invention relate generally to a four-stroke, multi-cylinder port injected internal combustion engine. Of course, the present invention is independent of the particular engine/vehicle technology or number of cylinders and may be used in a wide variety of applications with various implementations including spark-ignition, compression-ignition, direct injected and/or port injected engines, for example.

Figure 1:
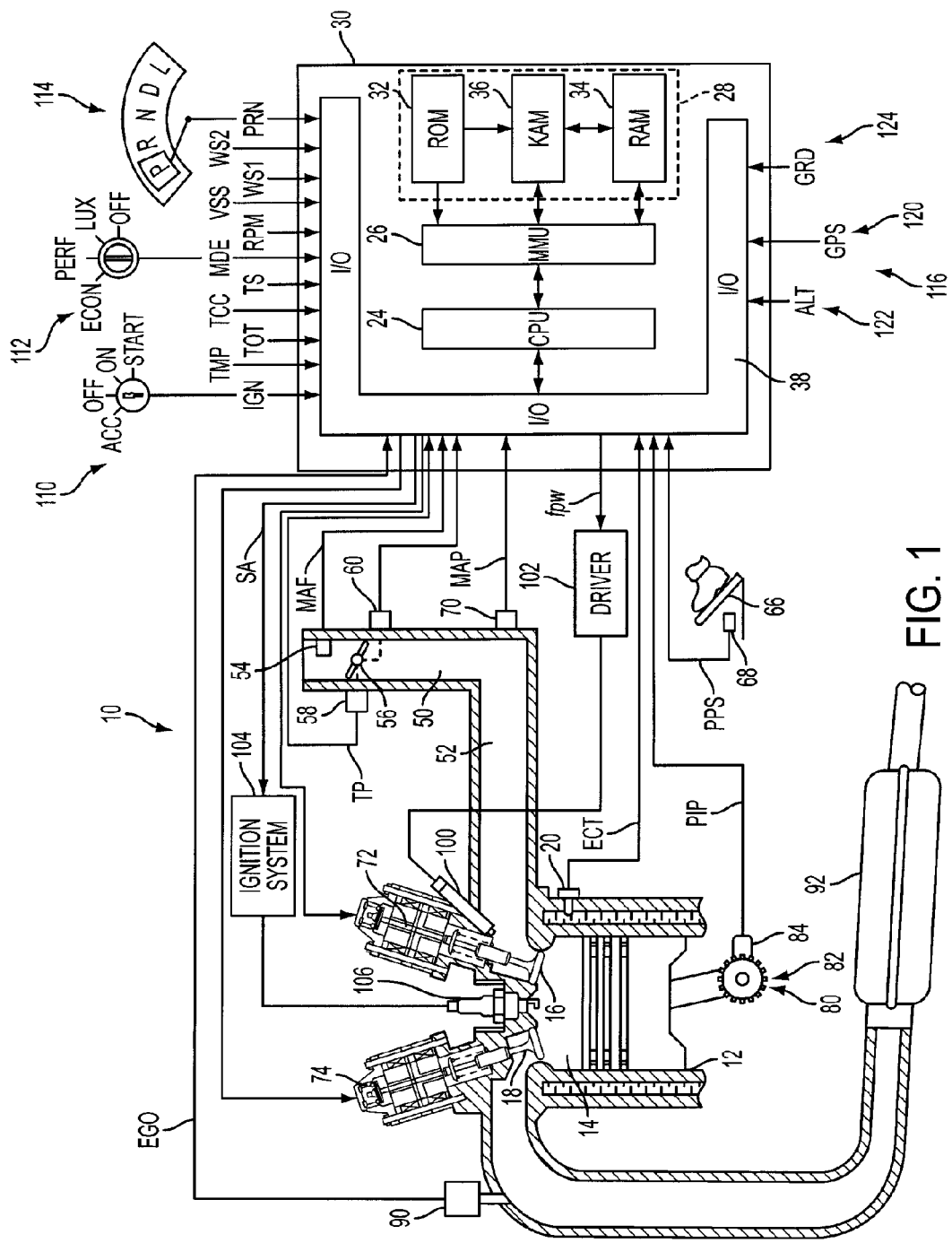
FIG. 1 is a block diagram illustrating operation of a representative engine/vehicle application with closed-loop deceleration control according to the present invention.

In the representative embodiment illustrated in FIG. 1, system 10 includes a vehicle (not specifically illustrated) powered by an internal combustion engine having a plurality of cylinders, represented by cylinder 12, with corresponding combustion chambers 14. As one of ordinary skill in the art will appreciate, system 10 includes various sensors and actuators to effect control of the engine/vehicle. One or more sensors or actuators may be provided for each cylinder 12, or a single sensor or actuator may be provided for the engine. For example, each cylinder 12 may include four gas exchange valves including two intake valves 16 and two exhaust valves 18, with only one of each shown in the Figure. However, the engine may include only a single engine coolant temperature sensor 20. In the embodiment illustrated in FIG. 1, the engine includes electromagnetically or electronically actuated intake valves 16 and exhaust valves 18 in communication with a microprocessor-based controller 30 to control valve opening and closing times to achieve a desired vehicle deceleration as described in greater detail below. In another embodiment of the present invention, intake valves 16 are electronically actuated and exhaust valves 18 are actuated by an associated camshaft (not shown). Alternatively, timing of intake valves 16 and/or exhaust valves 18 may be modified in response to a vehicle deceleration error using a variable cam timing mechanism as known by those of ordinary skill in the art.

Controller 30 has a microprocessor 24, called a central processing unit (CPU), in communication with memory management unit (MMU) 26. MMU 26 controls the movement of data among the various computer readable storage media 28 and communicates data to and from CPU 24. Computer readable storage media 28 preferably include volatile and nonvolatile storage in read-only memory (ROM) 32, random-access memory (RAM) 34, and keep-alive memory (KAM) 36, for example. KAM 36 may be used to store various operating variables while CPU 24 is powered down. Computer-readable storage media 28 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 24 in controlling the engine or vehicle into which the engine is mounted. Computer-readable storage media 28 may also include floppy disks, CD-ROMs, hard disks, and the like.

CPU 24 communicates with various engine/vehicle sensors and actuators via an input/output (I/O) interface 38. Interface 38 may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to CPU 24. Examples of items that may be directly or indirectly actuated under control of CPU 24, through I/O interface 38, are fuel injection timing, rate, and duration, throttle valve position, spark plug ignition timing (for spark-ignition engines), intake/exhaust valve timing and duration, front-end accessory drive (FEAD) components such as an alternator, and the like. Sensors communicating input through I/O interface 38 may be used to indicate crankshaft position (PIP), engine rotational speed (RPM), wheel speed (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, air flow (MAF), transmission gear or ratio (PRN), transmission oil temperature (TOT), transmission turbine speed (TS), torque converter clutch status (TCC), deceleration or shift mode (MDE), for example.

Some controller architectures do not contain an MMU 26. If no MMU 26 is employed, CPU 24 manages data and connects directly to ROM 32, RAM 34, and KAM 36. Of course, the present invention could utilize more than one CPU 24 to provide engine control and controller 30 may contain multiple ROM 32, RAM 34, and KAM 36 coupled to MMU 26 or CPU 30 depending upon the particular application.

In operation, air passes through intake 50 and is distributed to the plurality of cylinders via an intake manifold, indicated generally by reference numeral 52. System 10 preferably includes a mass airflow sensor 54 that provides a corresponding signal (MAF) to controller 30 indicative of the mass airflow. A throttle valve 56 may be used to modulate the airflow and control pressure in intake 50 to control engine torque and resulting vehicle deceleration as described herein. Throttle valve 56 is preferably electronically controlled by an appropriate actuator 58 based on a corresponding throttle position (TP) signal generated by controller 30. The throttle position (TP) signal may be generated in response to a corresponding engine output or torque requested by an operator via accelerator pedal 66 and/or in response to a desired vehicle deceleration profile when accelerator pedal 66 is fully released, also referred to as a closed-pedal position. A throttle position sensor 60 provides a feedback signal to controller 30 indicative of the actual position of throttle valve 56 to implement closed loop control of throttle valve 56.

A manifold absolute pressure sensor 70 is used to provide a signal (MAP) indicative of the manifold pressure to controller 30. Air passing through intake manifold 52 enters combustion chamber 14 through appropriate control of one or more intake valves 16. Intake valves 16 and/or exhaust valves 18 may be controlled using electromagnetic actuators 72, 74, a conventional camshaft arrangement, a variable camshaft timing arrangement, or a combination thereof depending on the particular application and implementation. In one embodiment, intake valves 72 are constant lift valves that are electromagnetically operated by controller 30 to control intake valve timing including opening, closing, and duration with exhaust valves 18 being operated by a conventional cam or variable cam device. Intake and/or exhaust valve timing and duration may be controlled in combination with throttle valve position to modulate engine torque to provide closed-loop feedback control of vehicle deceleration according to the present invention.

Rotational position information for controlling the engine may be provided by a crankshaft position sensor 80 that includes a toothed wheel 82 and an associated sensor 84. Crankshaft position sensor 80 may be used to generate a signal (PIP) used by controller 30 for fuel injection and ignition timing. In one embodiment, a dedicated integrated circuit chip (EDIS) within controller 30 is used to condition/process the raw rotational position signal generated by position sensor 80 and outputs a signal (PIP) once per cylinder per combustion cycle, i.e. for a four-cylinder engine, four PIP signals per combustion cycle are generated for use by the control logic. Crankshaft position sensor 80 may also be used to determine engine rotational speed and to identify cylinder combustion based on an absolute, relative, or differential engine rotation speed.

An exhaust gas oxygen sensor 90 provides a signal (EGO) to controller 30 indicative of whether the exhaust gasses are lean or rich of stoichiometry. Depending upon the particular application, sensor 90 may provide a two-state signal corresponding to a rich or lean condition, or alternatively a signal that is proportional to the stoichiometry of the exhaust gases. This signal may be used to adjust the air/fuel ratio, or control the operating mode of one or more cylinders, for example. The exhaust gas is passed through the exhaust manifold and one or more catalysts 92 before being exhausted to atmosphere.

A fuel injector 100 injects an appropriate quantity of fuel in one or more injection events for the current operating mode based on a signal (FPW) generated by controller 30 and processed by driver 102. At the appropriate time during the combustion cycle, controller 30 generates a spark signal (SA) that is processed by ignition system 104 to control spark plug 106 and initiate combustion within chamber 14.

As also illustrated in FIG. 1, controller 30 may receive inputs from various vehicle switches, selectors, or other devices such as an ignition switch 110, mode switch 112, gear or ratio selector 114, and road/vehicle grade sensor/indicator, indicated generally by reference numeral 116, which may include a global positioning system (GPS) 120, altitude sensor (ALT) 122, and/or grade sensor (GRD) 124. As described in greater detail with reference to FIGS. 2 and 3, the present invention may use a mode selector switch 112 in combination with position of gear selector 114 (or corresponding gear ratio) and/or vehicle/road grade provided by one or more sensors 116 to determine a desired deceleration rate or profile. For applications having driver selectable deceleration profiles, mode switch 112 may be used to indicate an economy (ECON), performance (PERF), luxury (LUX), or off-road (OFF) mode, for example. Alternatively, the (OFF) mode may be used to disable vehicle deceleration control so that the vehicle deceleration is open-loop. Vehicle/road grade may be provided by monitoring changes in altitude provided by a GPS sensor 120 or altitude sensor 122. Similarly, a grade sensor 124 may provide an indication of the current road grade. Those of ordinary skill in the art will recognize that vehicle/road grade may be inferred from various engine/vehicle sensors for applications that do not have a grade or altitude sensor.

Controller 30 includes software and/or hardware implementing control logic to control the engine to reduce error between measured and desired vehicle deceleration in response to accelerator pedal 66 being released when the vehicle is moving. As described in greater detail with reference to FIGS. 2 and 3, controller 30 may determine current actual vehicle deceleration based on signals of one or more sensors that provide signals indicative of rotational speed of at least one vehicle component, such as wheel speed sensors (WS1, WS2), vehicle speed sensor (VSS), etc. A desired deceleration rate or profile may be determined based on current transmission gear or gear ratio as indicated by selector 114, vehicle speed as indicated by vehicle speed sensor (VSS) and road grade as indicated by a corresponding grade sensor 116. Controller 30 implements closed loop control by comparing the actual vehicle deceleration to the desired vehicle deceleration to generate a difference or error value, and then controls one or more engine actuators to reduce the difference or error. For example, controller 30 may control intake valves 16, exhaust valves 18, throttle valve 56, timing of spark plug 106 and/or fuel timing/metering via fuel injector 100 to adjust the net engine output power or torque taking into account any additional load of front-end accessory drive (FEAD) components to achieve a desired vehicle deceleration rate or profile according to the present invention. Some applications may include one or more controllable engine components, such as an alternator, that may be controlled to achieve a desired engine torque (positive or negative) to provide closed-loop closed-pedal deceleration control.

Figure 2:
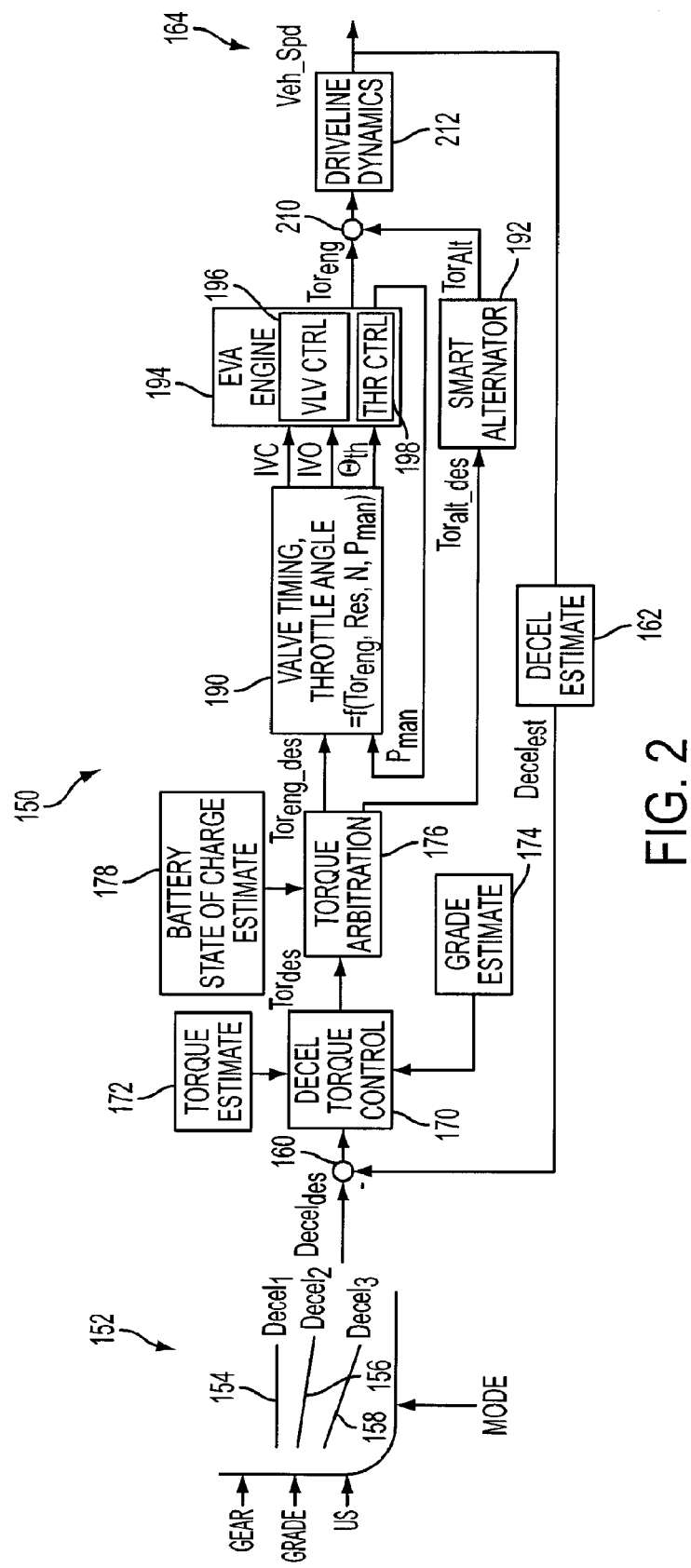
FIG. 2 is a block diagram illustrating a representative control strategy for an engine/vehicle with closed-loop deceleration control according to the present invention.
Figure 3:
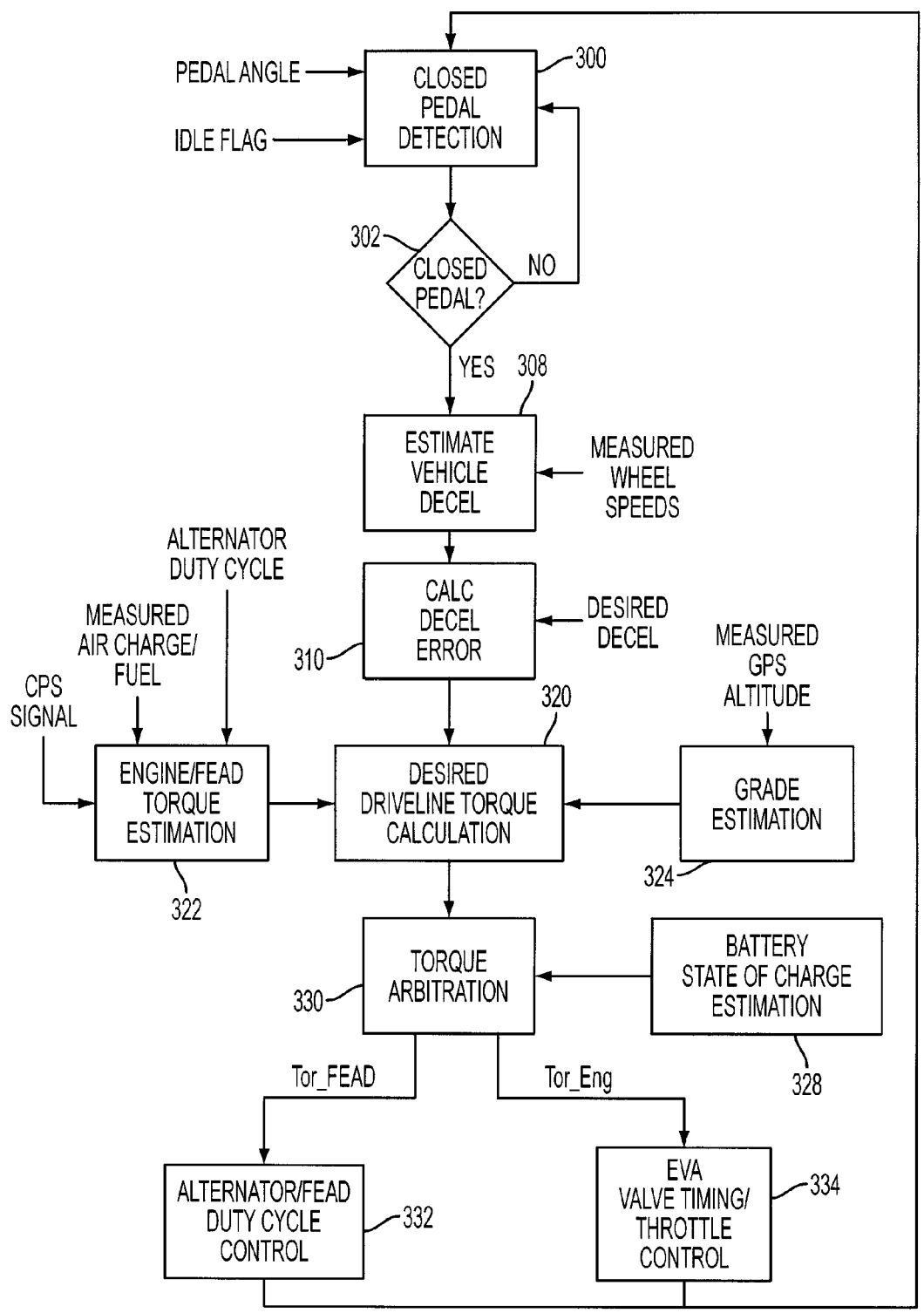
FIG. 3 is a flow chart illustrating operation of a system or method for closed-pedal deceleration control according to the present invention.

A block diagram and flow chart illustrating operation of representative embodiments of a system and method for controlling an internal combustion engine to provide a desired closed-pedal deceleration profile according to the present invention are shown in FIGS. 2 and 3. The diagrams of FIGS. 2 and 3 provide representative control strategies for a spark-ignition internal combustion engine having electromagnetically actuated intake valves. As will be appreciated by one of ordinary skill in the art, a control strategy according to the present invention may also be applied or adapted for use with various other engine technologies as previously described. The control strategies and/or logic illustrated in FIGS. 2 and 3 represent any of a number of known processing strategies such as event-driven, interrupt-driven, multi-tasking, multi-threading, and the like. As such, various steps or functions illustrated may be performed in the sequence illustrated, in parallel, or in some cases omitted. Although not explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages of the invention, but is provided for ease of illustration and description. Preferably, the control logic is implemented primarily in software executed by a microprocessor-based vehicle, engine, and/or powertrain controller, such as controller 30 (FIG. 1). Of course, the control logic may be implemented in software, hardware, or a combination of software and hardware in one or more controllers depending upon the particular application. When implemented in software, the control logic is preferably provided in one or more computer-readable storage media having stored data representing code or instructions executed by a computer to control the engine. The computer-readable storage media may include one or more a number of known physical devices which utilize electric, magnetic, and/or optical storage to keep executable instructions and associated calibration information, operating variables, and the like.

In either a conventional cam-actuated or electromagnetic valve actuation (EVA) engine, the closed pedal deceleration can be controlled to a desired rate or profile according to the present invention by adjusting the net engine output, i.e. the engine torque or power minus any controlled or un-controlled front end accessory drive (FEAD) component loads with deceleration feedback provided by vehicle speed, transmission speed, or engine speed. If vehicle speed is used, then the difference between a commanded and actual vehicle speed, would be used to drive a vehicle speed controller which would in turn adjust the engine torque or power and/or FEAD loads to match a desired closed-pedal vehicle speed profile. The closed-pedal deceleration characteristic is then determined by the vehicle speed profile, which can be calibrated as a function of engine speed and load and other engine and/or ambient operating conditions, such as transmission gear and road grade, for example.

The vehicle speed controller could be based purely upon a vehicle speed feedback strategy that uses the vehicle speed error to drive a proportional-integral-derivation (PID) controller or other control structure to adjust the engine torque/power and/or FEAD loads, or it can include an inner torque feedback loop as illustrated in FIG. 2 to enhance the closed-loop response.

Controller 150 of FIG. 2 determines a desired deceleration rate or profile, which may be stored in a look-up table 152 based on one or more engine, vehicle and/or ambient operating parameters. In the illustrated example, a desired closed-pedal deceleration characteristic may be determined based on current transmission gear or gear ratio, road grade, vehicle speed, and/or optional mode switch. Depending upon the particular application, a desired deceleration or vehicle speed profile may be selected from a plurality of available profiles as generally represented by curves 154, 156, and 158. Some applications may have only a single, predetermined deceleration profile for a particular vehicle type, but different profiles or characteristics for other vehicle types or brands. Likewise, depending upon the particular application and implementation, a desired deceleration profile may be selected by the driver based solely on a selector switch position, based on a switch position in combination with engine/vehicle/ambient operating conditions, or automatically determined by the controller based on current operating conditions. The desired deceleration is then compared to a measured or calculated current vehicle deceleration at block 160 to generate a difference signal. An estimated or calculated actual deceleration may be determined by block 162 based on vehicle speed 164, or another rotating engine/vehicle component with a known relationship to vehicle speed. Alternatively, an accelerometer may be used to provide a signal indicative of actual vehicle deceleration. The difference signal or value is then provided to deceleration torque control 170.

If controller 150 uses an inner torque feed-back loop as illustrated in FIG. 2, an estimate or measure of the current engine torque is determined as represented by block 172. Any of a number of known methods may be used to estimate engine/driveline torque, including estimates based upon measured air charge, fuel injector pulse width, torque converter slip and crankshaft, transmission an/or wheel speed sensors. Torque estimate 172 is used in combination with grade estimate 174 to determine a desired total torque to reduce the deceleration error or difference signal/value provided by block 160 to achieve the desired deceleration profile.

To take full advantage of the net engine torque output, the present invention recognizes that it is desirable (although not required) to divide the net engine or powertrain torque/power output into an engine and a FEAD component. The FEAD component corresponds to the torque contribution from any controllable devices on the FEAD, such as a smart alternator or a variable output fan or water pump, that can be used to increase or decrease the net torque/power output of the engine. Therefore, the total powertrain torque command determined at 170 is subdivided by torque arbitration logic 176 into torque commands for the controllable FEAD components based upon the state of each of these sub-systems, e.g. using an estimate of the battery state of charge 178 as an input to the smart alternator charge rate/torque output calculation. The desired engine combustion torque determined by torque arbitration 176 is used to determine fuel quantity and/or timing, spark timing, and air charge. In a conventional engine, the air charge or flow rate is controlled primarily via the electronic throttle control, ETC. However, if the ETC is used to control the engine torque, the intake manifold dynamics and the time response of the ETC will limit the responsiveness of the engine to a commanded torque. Alternatively spark retard or fuel can be used to rapidly control the engine torque, but these techniques may affect fuel economy and/or emissions. In an EVA engine, the air charge is controlled on a cylinder-by-cylinder basis by the intake valves, while the intake manifold pressure is held constant by the throttle valve position. As such, by controlling the valve timing on an EVA engine, the torque output of each cylinder can be adjusted between the maximum negative or positive output torque on a cycle-by-cycle basis. This ability of the EVA engine gives it both a torque control authority, i.e. range of torque potential, and responsiveness that is substantially greater than a conventional engine, which has been verified by simulation analysis. As such, it is desirable to use EVA control where engine speed and load permit as the primary control with throttle valve control only if necessary based on operating conditions and the required output torque. Depending upon the particular application and implementation it may also be possible to reduce the number of firing cylinders and control pumping losses of non-firing cylinders by appropriate intake/exhaust valve actuation.

If the battery state of charge estimate 178 indicates that the vehicle battery can accept an additional charge from smart alternator 192, torque arbitration logic 176 may control smart alternator 192 accordingly. The desired engine torque determined by arbitration logic 176 is used by block 190 to determine a desired intake and/or exhaust valve timing and/or throttle valve position as a function of engine speed (N), residual mass fraction (Res), manifold pressure (Pman) to produce the desired combustion torque. Intake valve close (IVC) timing, intake valve open (IVO) timing, and throttle valve position (□th) values determined by logic 190 are provided to corresponding closed loop position controllers 196, 198 of EVA engine control 194 to control actuation of the devices. The combined engine and alternator torque at 210 acts to decrease vehicle speed 164 based on vehicle driveline dynamics 212, which represent the longitudinal dynamics of the vehicle and may include engine/transmission inertia, FEAD friction, pumping losses, transmission gear, final drive ratio, etc.

A flow chart illustrating operation of a system or method for closed-pedal deceleration control according to the present invention is illustrated in FIG. 3. Block 300 monitors accelerator pedal position and optionally one or more other operating conditions as generally represented by the engine idle flag at block 302 to determine when closed-pedal deceleration control is indicated. As those of ordinary skill in the art will recognize, most applications control engine speed from a running speed to idle speed when the accelerator pedal is released. Depending upon the particular application and implementation, deceleration control according to the present invention may use one or more engine operating conditions or flags, such as an idle flag as shown in FIG. 3, to determine when to begin and/or end closed loop deceleration control. For example, deceleration control may begin when the accelerator pedal is released and end by transitioning to idle control when the engine speed approaches idle speed. Alternatively, in some applications, such as hybrid engines, the engine may be defueled and/or stopped before beginning deceleration control. When deceleration control is active as determined by blocks 300 and 302, block 308 determines a current vehicle deceleration estimate based on measured wheel speeds or vehicle speed. Measured wheel speeds may also be used to automatically determine whether the vehicle is operating on-road or off-road based on differential wheel speeds or wheel slip. This determination may optionally be used in determining a desired deceleration rate or profile in some applications.

Block 310 determines a difference value or signal between a desired deceleration and the current estimated deceleration that is used by block 320 to calculate a desired driveline torque or total torque. The desired driveline torque calculation may be based on an estimate of road grade as represented by block 324, which in turn may be provided by an integrated GPS altitude measurement or similar device. In addition, the desired driveline torque calculation uses an estimate of the current engine/FEAD torque as represented by block 3222. The current engine/accessory torque estimate may be determined using a crankshaft position sensor (CPS), measured air charge and fuel, and alternator duty cycle, for example. An estimation of the current battery state of charge is provided by block 328 along with the desired drive torque calculation of block 320 to a torque arbitration strategy 330 that allocates the desired torque between the engine and one or more engine driven accessories, which may include one or more controllable or variable torque consumers. An alternator or other FEAD component is then controlled based on the allocated FEAD torque component as represented by block 332 with the engine controlled based on the allocated engine torque as represented by block 334. After determining a desired engine torque, a first engine operating point may be determined based on engine speed and vehicle speed, for example. At least one engine actuator, which may include intake and/or exhaust valve timing and throttle valve position, is controlled to provide the desired engine torque as represented by block 334. The closed-loop deceleration control strategy illustrated in FIGS. 2 and 3 may subsequently determine a second engine torque based on the same first engine operating point in response to varying vehicle operating conditions and control at least one engine actuator to provide the second engine torque as represented by block 334 to control vehicle deceleration to a desired stored deceleration profile.

As such, the present invention provides a more consistent closed-pedal deceleration behavior that is less dependent on the operating environment to enhance vehicle drivability. Closed-loop control of vehicle deceleration when the accelerator pedal is released according to the present invention facilitates a deceleration calibration profile for different vehicle types or brands, different operating conditions, and/or a driver selectable deceleration profile.

While the best mode for carrying out the invention has been described in detail, those familiar with the art to which this invention relates will recognize various alternative designs and embodiments for practicing the invention as defined by the following claims.

What is claimed is:

1. A system for controlling deceleration of a vehicle having a multiple cylinder internal combustion engine, each cylinder having at least one electronically actuated gas exchange valve, the system comprising:
   a microprocessor-based controller;
   an accelerator pedal mounted in a passenger compartment of the vehicle and including a position sensor in communication with the controller;
   a speed sensor in communication with the controller for determining vehicle speed based on rotational speed of at least one vehicle component; and
   an engine driven electrically controllable vehicle accessory in communication with the controller;
   wherein the controller determines a desired vehicle deceleration when the speed sensor indicates the vehicle is moving and the accelerator position sensor indicates the accelerator pedal has moved to a released position, the controller further controlling the at least one gas exchange valve and electrically controllable vehicle accessory such that measured vehicle deceleration approaches the desired vehicle deceleration.

2. The system of claim 1 further comprising an electronically controlled throttle valve having an actuator in communication with the controller, wherein the controller determines a desired engine torque based on an error between the desired and measured vehicle deceleration and controls position of the throttle valve, timing of the at least one gas exchange valve, and actuation of the engine driven accessory to achieve the desired engine torque.

3. A computer readable storage medium having stored data representing instructions executable by a computer to control an internal combustion engine in a vehicle having an accelerator pedal, the computer readable storage medium comprising:
   instructions for controlling at least one engine actuator to provide a first engine torque corresponding to a first engine operating point in response to the accelerator pedal being released; and
   instructions for controlling at least one engine actuator to provide a second engine torque corresponding to the first engine operating point in response to the accelerator pedal being released, the second engine torque varying with vehicle operating conditions.

4. A method for controlling an internal combustion engine in a vehicle having an accelerator pedal to provide a characteristic vehicle deceleration under varying ambient conditions, the method comprising:
   controlling at least one engine actuator to provide a first engine torque corresponding to a first engine operating point in response to the accelerator pedal being released; and
   controlling at least one engine actuator to provide a second engine torque corresponding to the first engine operating point in response to the accelerator pedal being released, the second engine torque varying with vehicle operating conditions.

5. The method of claim 4 wherein controlling at least one engine actuator comprises controlling throttle valve position.

6. The method of claim 4 wherein controlling at least one engine actuator comprises controlling engine valve timing.

7. The method of claim 4 wherein the first engine operating point is determined based on vehicle speed and engine speed.

8. The method of claim 4 wherein the vehicle operating conditions include rate of vehicle deceleration.

9. A method for controlling an internal combustion engine in a vehicle having an accelerator pedal, the method comprising:
   controlling the engine to reduce error between measured and desired vehicle deceleration in response to the accelerator pedal being released.

10. The method of claim 9 wherein the step of controlling the engine comprises controlling actuation of electronically actuated engine valves.

11. The method of claim 10 wherein the step of controlling the engine comprises controlling actuation of electronically actuated intake valves to control engine torque.

12. The method of claim 9 wherein the step of controlling the engine comprises controlling a front end accessory drive to control engine torque.

13. The method of claim 12 wherein the step of controlling the engine comprises controlling an alternator to control engine torque.

14. The method of claim 9 wherein the step of controlling the engine comprises controlling position of an electronically controlled throttle valve.

15. The method of claim 9 wherein the desired vehicle deceleration is determined in response to position of a driver-actuated mode selector.

16. The method of claim 9 wherein the desired vehicle deceleration is automatically determined in response to current operating conditions.

17. The method of claim 9 further comprising:
    determining whether the vehicle is operating on-road or off-road; and
    selecting a first desired deceleration profile when the vehicle is operating on-road and selecting a second deceleration profile when the vehicle is operating off-road.

18. The method of claim 9 wherein the step of controlling the engine comprises controlling engine torque to reduce the error between measured and desired vehicle deceleration.

19. The method of claim 9 wherein the step of controlling the engine comprises:
    determining a desired deceleration in response to current transmission gear ratio, current vehicle speed, and road grade.

20. The method of claim 9 wherein the step of controlling the engine comprises:
    determining desired deceleration in response to current operating conditions;
    determining a desired total torque in response to the error between desired and measured deceleration;
    determining a desired engine torque and accessory drive torque based on the desired total torque;
    controlling at least one of spark timing, fuel metering, engine valve timing, and throttle position in response to the desired engine torque; and
    controlling at least one accessory in response to the desired accessory drive torque.

21. The method of claim 20 further comprising controlling number of firing cylinders in response to the desired engine torque.

22. The method of claim 21 further comprising controlling valve actuation of deactivated cylinders in response to the desired engine torque.

* * * * *